United States Patent [19]
Hufford et al.

[11] Patent Number: 5,877,445
[45] Date of Patent: *Mar. 2, 1999

[54] SYSTEM FOR GENERATING PRESCRIBED DURATION AUDIO AND/OR VIDEO SEQUENCES

[75] Inventors: Geoffrey Calvin Hufford, Granada Hills; Christopher P. Hufford; Kevin C. Klingler, both of Chatsworth, all of Calif.

[73] Assignee: Sonic Desktop Software, Chatsworth, Calif.

[ * ] Notice: The term of this patent shall not extend beyond the expiration date of Pat. No. 5,693,902.

[21] Appl. No.: 957,422
[22] Filed: Oct. 24, 1997

Related U.S. Application Data

[63] Continuation-in-part of Ser. No. 532,527, Sep. 22, 1995, Pat. No. 5,693,902.
[51] Int. Cl.[6] ............................................. G10H 7/00
[52] U.S. Cl. ............................. 84/602; 84/609; 84/610; 84/649; 84/650
[58] Field of Search .................... 84/609–610, 615, 84/634, 649, 650, 653, 601–604

[56] References Cited

U.S. PATENT DOCUMENTS 5,300,725   4/1994   Manabe ................................ 84/609
5,455,378   10/1995   Paulson et al. ......................... 84/610
5,521,323   5/1996   Paulson et al. ......................... 84/610

*Primary Examiner*—William M. Shoop, Jr.
*Assistant Examiner*—Marlon T. Fletcher
*Attorney, Agent, or Firm*—Freilich, Hornbaker & Rosen

[57] ABSTRACT

A block sequence compiler for compiling a sequence of audio and/or video blocks (e.g., audio tracks, MIDI, video clips, animation, etc.) suitable for producing one or more audio and/or video output sequences (i.e., audio, video, or multimedia) each having a duration corresponding to user-prescribed criteria. In a preferred embodiment, a user chooses an audio and/or video source segment from a predefined library and prescribes the duration of an audio and/or video sequence. Prior to depositing each audio and/or video segment in the library, the segment is partitioned into audio and/or video blocks that are identified in a corresponding characteristic data table with characteristics including (1) duration, (2) suitability for being used as a beginning or ending of an audio and/or video sequence, and (3) compatibility with each block. Using this characteristic table and the user-prescribed criteria, i.e., duration, the block sequence compiler generates a plurality of audio and/or video sequences satisfying the user-prescribed criteria which can be reviewed, e.g., played, and/or saved for future use.

20 Claims, 12 Drawing Sheets

|  | A | B | C | D | E | F | G | H | I | J |
|---|---|---|---|---|---|---|---|---|---|---|
| DURATION —34 | 5 | 5 | 5 | 5 | 5 | 5 | 5 | 5 | 5 | 5 |
| BEGINNING/ ENDING —36 | B |  | B |  | E |  |  |  |  | E |
| COMPATIBILITY LIST —38 | B | C | D | E | F | G H | H J | E I | J |  |

FIG. 4

|   | 0 | 1 | 2 | 3 | 4 | 5 | 6 | 7 |   |   |
|---|---|---|---|---|---|---|---|---|---|---|
|   | A |   |   |   |   |   |   |   | length = 5 | A is the first block considered and it is a beginning so it is put in slot 1 |
|   | A | B |   |   |   |   |   |   | length = 10 | B is considered next and it is checked for compatibility with A |

FIG. 5

*
slots continue to be filled until...

|   | 0 | 1 | 2 | 3 | 4 | 5 | 6 | 7 |   |   |
|---|---|---|---|---|---|---|---|---|---|---|
|   | A | B | C | D | E | F | G |   | length = 30 | the length is >= the desired length |
|   | A | B | C | D | E | F | G | H | length = 35 | H is checked as an ending, it is not so it is removed |
|   | A | B | C | D | E | F | G | H | length = 35 | I is tried and not compatible with G, so J is tried next |
|   | A | B | C | D | E | F | G |   | length = 30 |   |
| ** | A | B | C | D | E | F | G | J | length = 35 | *** J is compatible with G and it is an ending, so this sequence is returned ** |

*
A SEQUENCE IS RETURNED
*

|   | 0 | 1 | 2 | 3 | 4 | 5 | 6 | 7 |   |   |
|---|---|---|---|---|---|---|---|---|---|---|
|   | A | B | C | D | E | F | G |   | length = 30 | to continue looking for the next combination, J is removed |
|   | A | B | C | D | E | F | G |   | length = 30 | J is the last block so A is tried next... |
|   | A | B | C | D | E | F | G |   | length = 30 | blocks A – G are tried (H was the first one tried in this slot) and none are compatible |
|   | A | B | C | D | E | F |   |   | length = 25 | so G is removed from slot 6 |
|   | A | B | C | D | E | F | H |   | length = 30 | H is compatible with F, so it is put in slot 6 |
|   | A | B | C | D | E | F | H |   | length = 30 | I, J, A, B, C, D are all tried in slot 7 and either not compatible or not endings |
| ** | A | B | C | D | E | F | H | E | length = 35 | *** E is both compatible and an ending, so this sequence is returned ** |

*
PROCESS CONTINUES...
*

|   | 0 | 1 | 2 | 3 | 4 | 5 | 6 | 7 |   |   |
|---|---|---|---|---|---|---|---|---|---|---|
|   | C |   |   |   |   |   |   |   | length = 5 | basic SEEDING is performed by putting another beginning block in the first slot |
| ** | C | D | E | F | G | H | I | J | length = 35 | *** and building a sequence from there. ** |

FIG. 7

| 0 | 1 | 2 | 3 | 4 | 5 | 6 | 7 | length | |
|---|---|---|---|---|---|---|---|---|---|
|   | A |   |   |   |   |   |   | length = 5  | A is the first block considered and it is a beginning so it is put in slot 1 |
|   | A | B |   |   |   |   |   | length = 10 | B is considered next and it is checked for compatibility with A |
|   |   |   |   |   |   |   |   |    | * slots continue to be filled until... |
|   | A | B | C | D | E | F | G | length = 30 | the length is >= the desired length |
|   | A | B | C | D | E | F | G | H | length = 35 | H is checked for compatibility with the first block (A), it is not so it is removed |
|   | A | B | C | D | E | F | G |   | length = 30 | I is tried and not compatible with G, so it is removed next |
|   | A | B | C | D | E | F | G | J | length = 35 | *** J is compatible with G and the first block (A), so this sequence is returned ** A SEQUENCE IS RETURNED |
|   | A | B | C | D | E | F | G |   | length = 30 | to continue looking for the next combination, J is removed |
|   | A | B | C | D | E | F | G |   | length = 30 | J is the last block so A is tried next... |
|   | A | B | C | D | E | F | G |   | length = 30 | blocks A - G are tried (H was the first one tried in this slot) and none are compatible |
|   | A | B | C | D | E | F |   |   | length = 25 | so G is removed from slot 6 |
|   | A | B | C | D | E | F | H |   | length = 30 | H is compatible with F, so it is put in slot 6 |
|   | A | B | C | D | E | F | H | * | length = 30 | I, J, A, B, C, D are all tried in slot 7 and either not compatible or not compatible with the first block (A) |
| ** | A | B | C | D | E | F | H | E | length = 35 | *** E is both compatible with H and the first block (A), so this sequence is returned ** OR ALTERNATIVELY WITH STEP 44 BYPASSED... |
|   | C |   |   |   |   |   |   | length = 5  | basic SEEDING is performed by putting another beginning block in the first slot (Note C is not a beginning block) |
| ** | C | D | E | F | G | H | I | J | length = 35 | *** and building a sequence from there. ** Note J is compatible with I and C is compatible to follow J |

|  | A | B | C | D | E | F | G | H | I | J |
|---|---|---|---|---|---|---|---|---|---|---|
| DURATION—34 | 5 | 5 | 5 | 5 | 5 | 5 | 5 | 5 | 5 | 5 |
| BEGINNING/ ENDING—36 | B | | | | E | | | | | |
| COMPATIBILITY LIST—38 | B | C | D | E | A F | C G H | D H J | E I | J | A C |

FIG. 8

| | A | B | C | D | E | F | G | H | I | J |
|---|---|---|---|---|---|---|---|---|---|---|
| DURATION — 34 | 5 | 5 | 5 | 5 | 5 | 5 | 5 | 5 | 5 | 5 |
| BEGINNING/ ENDING — 36 | B | B | | | E | | | | | E |
| COMPATIBILITY LIST — 38 | B | C | D | C E | D F | E G H | H J | E I | J | |
| REVERSIBLE — 66 | | X | X | X | X | X | | | | |

FIG. 10

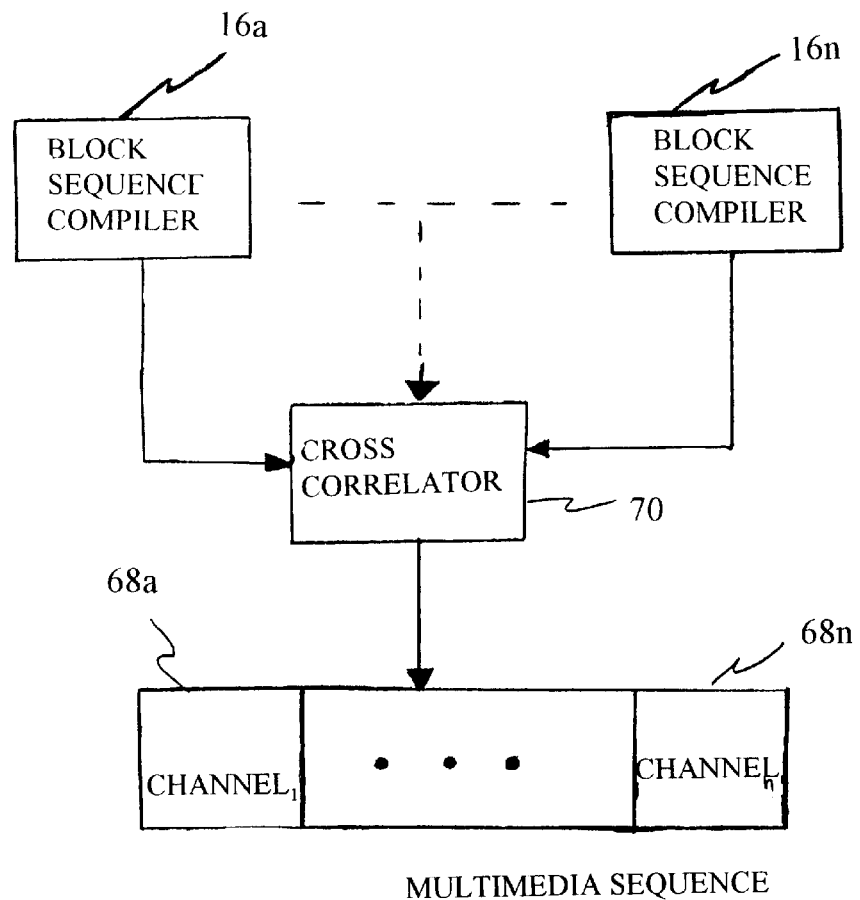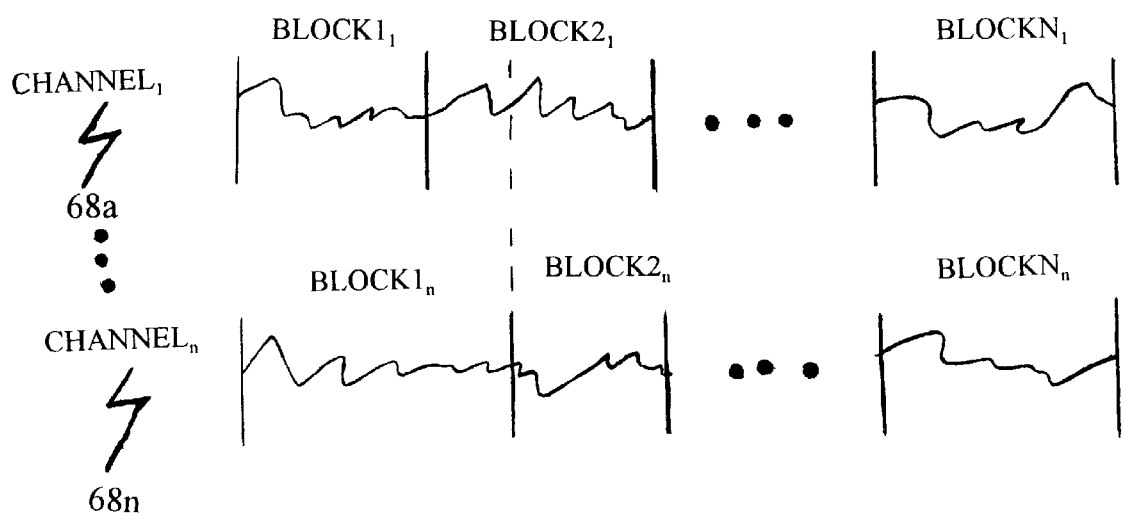
FIG. 12

SYSTEM FOR GENERATING PRESCRIBED DURATION AUDIO AND/OR VIDEO SEQUENCES

This application is a continuation in part of application Ser. No. 08/532,527, filed Sep. 22, 1995, now U.S. Pat. No. 5,693,902.

BACKGROUND OF THE INVENTION

The present invention relates generally to hardware/software systems for generating audio and/or video sequences of prescribed duration and more particularly to such systems suitable for generating and correlating such sequences for producing multimedia presentations.

Exemplary multimedia presentations are formed from video source material, e.g., a video segment such as a film clip, and audio source material, e.g., an audio segment such as a sound track. Typically, the video source segment must be edited many times before an aesthetically satisfactory and proper duration video output sequence is achieved. The audio source segment must similarly be edited to form an audio output sequence that matches the duration of the edited video output sequence.

SUMMARY OF THE INVENTION

The present invention is directed toward a system for compiling a sequence of data blocks for producing an audio and/or video output sequence having a duration corresponding to user-prescribed criteria.

In a preferred embodiment, a user (via a keyboard and/or mouse and a display monitor) chooses an audio and/or video source segment from a data storage library storing data representing original sound tracks, MIDI data, film clips, animation clips, etc., and prescribes the desired duration of an audio and/or video output sequence. Each segment in the data storage library is divided into data blocks whose characteristics are identified in a stored characteristic data table. Exemplary characteristics include (1) duration, (2) suitability for being used as a beginning or ending of an output sequence, and (3) interblock compatibility. Using this stored characteristic table and user-prescribed criteria (e.g., a duration specified via the keyboard), a block sequence compiler (preferably a software program executed by a computer) generates a plurality of audio and/or video block sequences satisfying these criteria which can be reviewed (e.g., played via an audio and/or video output device or displayed on a monitor) and/or saved for future use.

In an exemplary use, the block sequence compiler compiles a first output sequence suitable for presentation on a first channel. Optionally, the block sequence compiler can also compile one or more additional output sequences compatible with the first output sequence (according to additional stored characteristic table parameters) suitable for presentation on additional output channels to create a multimedia presentation.

In a further aspect of a preferred embodiment, the block sequence compiler is responsive a user-prescribed mood parameter stored in the characteristic table.

In a still further aspect of a preferred embodiment, the stored characteristic table additionally contains a parameter that identifies blocks that are fadeable. When a fadeable block is selected as an end block, the block sequence compiler can truncate the fadeable end block to generate an output sequence of the prescribed length which might otherwise not be achievable.

In a further aspect of a preferred embodiment, the block sequence compiler is responsive to a user-prescribed intensity parameter stored in the stored characteristic table.

In a still further aspect of a preferred embodiment, each block is identified in the stored characteristic table as having a hit point that defines the location (when present) of an intensity burst. The block sequence compiler can use the hit point parameter to place an intensity burst at a user-prescribed location in the compiled output sequence.

In another aspect of a preferred embodiment, the system enables a user to generate a sequence (or subsequence) of data blocks which can be executed one or more times, e.g., looping, to form an output sequence of extended duration. In a first variation, the compiler selects the last block of a sequence which is compatible with the first block to generate a repeatable sequence. Accordingly, the repeatable sequence can be repetitively executed from the first to the last block and then looped back to the first block. In a second variation, blocks in the repeatable sequence are selected which have a reversible attribute, i.e., blocks that can be played either in a forward or a reverse direction. Accordingly, the repeatable sequence can be repetitively played in a forward direction from the first to the last block and then in a reverse direction from the last block to the first block, again resulting in a sequence having an extended duration.

Other features and advantages of the present invention should become apparent from the following description of the presently-preferred embodiments, taken in conjunction with the accompanying drawings, which illustrate, by way of example, the principles of the present invention.

BRIEF DESCRIPTION OF THE DRAWINGS

FIG. 4 is an exemplary characteristic table for a fifty second source audio and/or video segment;

FIG. 5 shows the iterations performed by the block sequence compiler according to the flow chart of FIG. 3B on the characteristic table data of FIG. 4;

FIG. 7 shows the iterations performed by the block sequence compiler according to the flow chart of FIG. 6 on the characteristic table data of FIG. 8;

FIG. 8 is an exemplary characteristic table for a fifty second source audio and/or video segment used in conjunction with the flow chart of FIG. 6;

FIG. 10 is an exemplary characteristic table for a fifty second source audio and/or video segment used in conjunction with the flow chart of FIG. 9;

FIG. 11 is block diagram an exemplary system for generating multiple compatible audio and/or video channels, i.e., multimedia, according to user-prescribed criteria; and FIG. 12 is a simplified diagram showing multiple audio and/or video channels generated by the exemplary system of FIG. 11.

DESCRIPTION OF THE PREFERRED EMBODIMENTS

Figure 1:
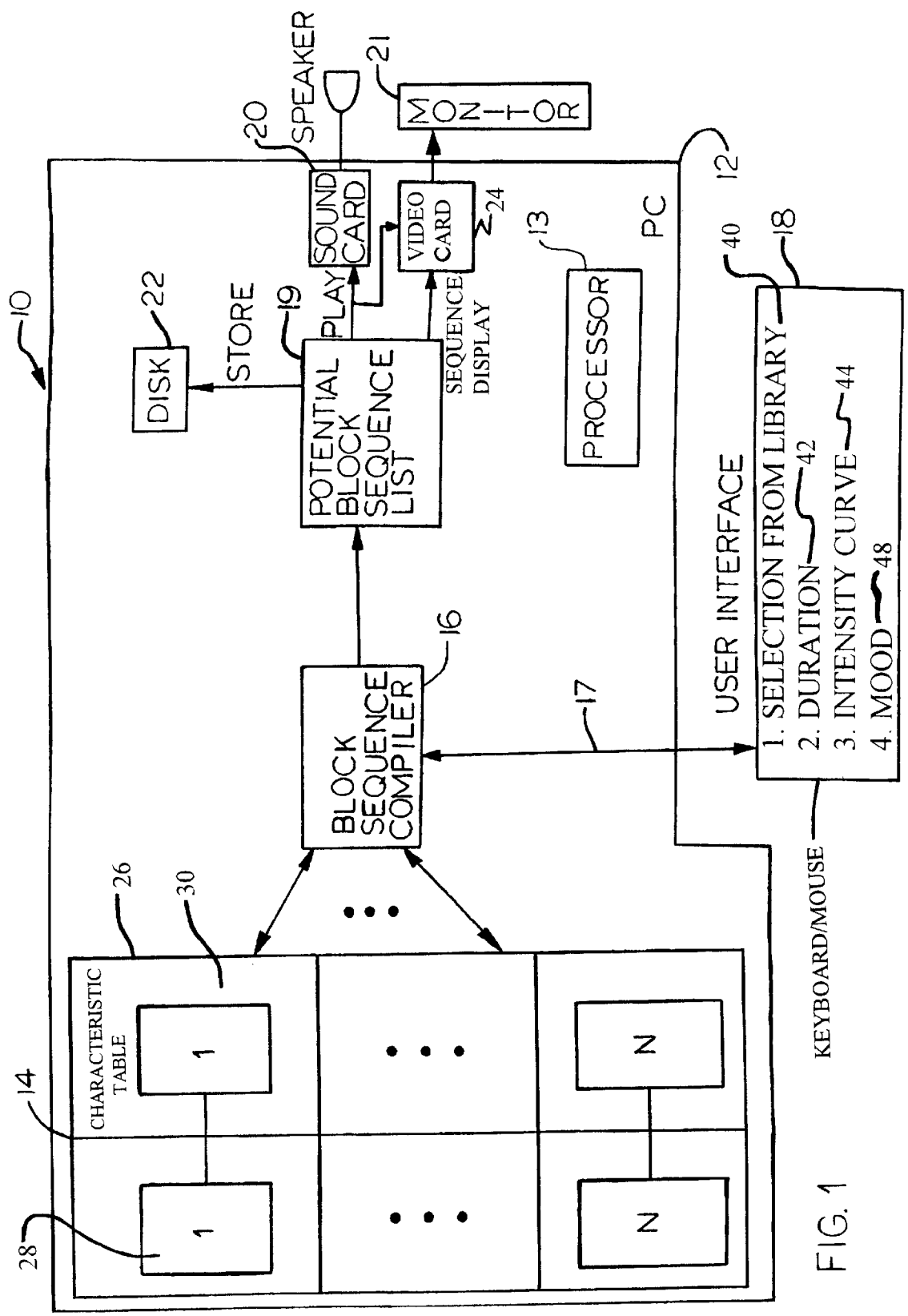
FIG. 1 comprises a functional block diagram of a block sequence compiler in accordance with the present invention for generating audio and/or video sequences having user-prescribed durations.

With reference now to the drawings, and particularly to FIG. 1, there is shown a block diagram of a preferred embodiment of an audio and/or video sequence generator 10 of the present invention for compiling a sequence of data blocks suitable for producing an audio and/or video output sequence having a duration corresponding to user-prescribed criteria. In a preferred embodiment, the sequence generator 10 is comprised of a computer-executed software program, generally initially present on a floppy disk, and which preferably finally resides on the hard disk of a personal computer (PC) 12, e.g., a Macintosh or IBM compatible PC, controlled by a processor 13. As such the following discussion, relates to these preferred PC environments. However, different computer platforms or hardware-only implementations are also considered within the scope of the invention.

The sequence generator 10 is primarily comprised of (1) a data storage library 14 (preferably comprised of data blocks corresponding to or pointing to audio tracks, MIDI data, video clips, animation, or any other data representative of sound or visual information) and (2) a block sequence compiler 16. In operation, a user interface 17, e.g., a keyboard/mouse 18, enables a user to select a source segment 28 from the data storage library 14 and prescribe a duration. This information is communicated to the block sequence compiler 16 which, under control of a software program executed by the processor 13 in the PC 12, fetches blocks of audio and/or video source information (preferably digital data) from the data storage library 14 and, according to compilation criteria described further below, compiles a list of potential audio and/or video sequences that are preferably temporarily stored within a potential block sequence list depository 19. In the case of audio (e.g., an audio track or MIDI data) output sequence, the user can select to play the audio sequence via a sound card/speaker 20, review a list of potential block sequences via a monitor 21, or store selected sequences for future use, e.g., on a hard disk 22. Alternatively, in the case of a video sequence (e.g., video clip or animation data), the user can select to play the video sequence (preferably via a video card 24 and monitor 21), review a list of potential block sequences via the monitor 21, or store selected sequences for future use, e.g., on the hard disk 22. In either case, the block sequence compiler 16 can preferably be directed to only compile a single audio and/or video output sequence and then wait until prompted by the user to generate a next audio and/or video output sequence.

Figure 2:
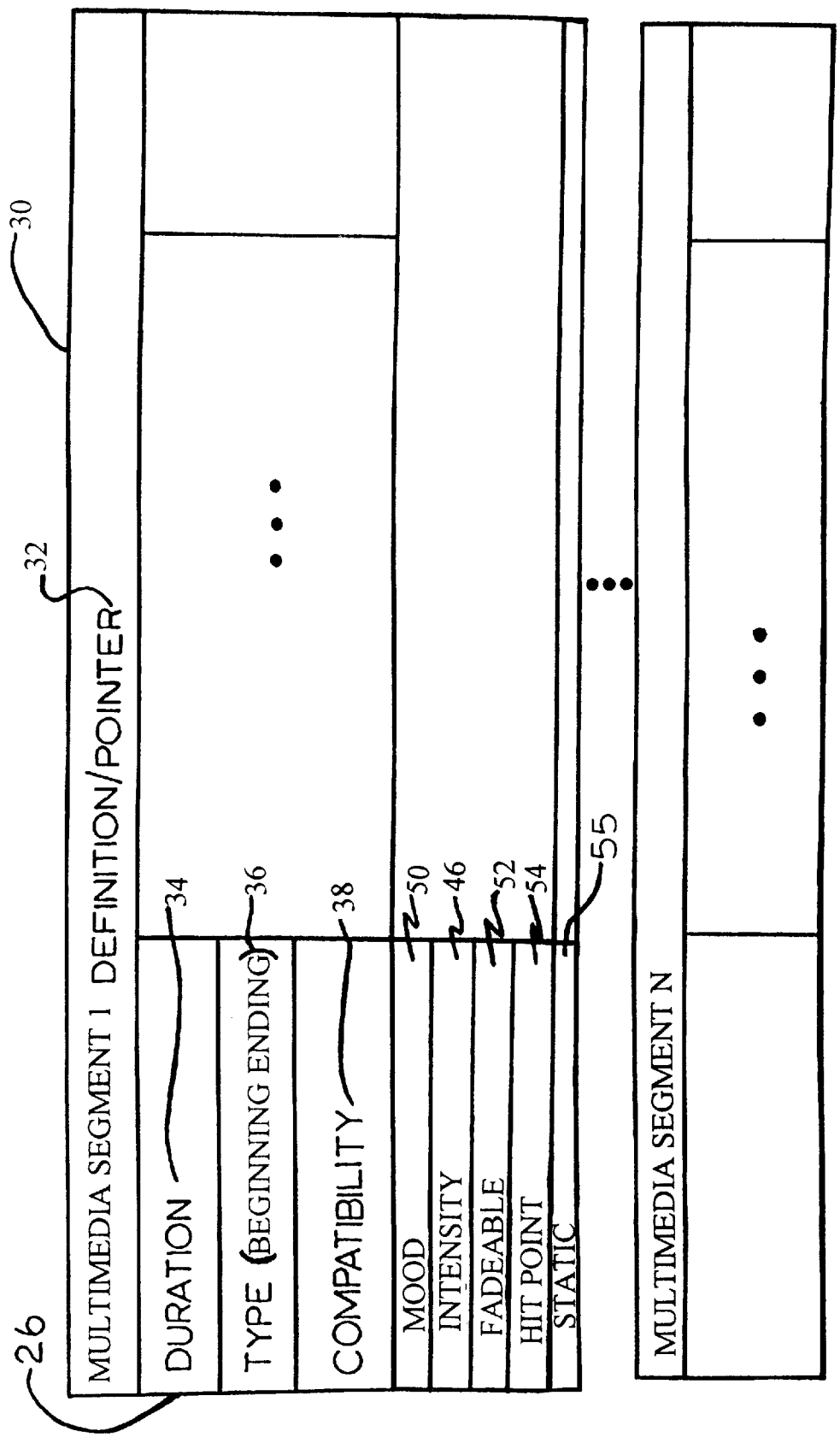
FIG. 2 is a simplified diagram of a characteristic table showing the parameters associated with each audio and/or video block.

The data storage library 14 preferably contains library entries 26 pertaining to a plurality of audio and/or video source segments. Each library entry 26 is comprised of (1) an audio and/or video source segment 28 and (2) a stored characteristic data table 30 which describes the partitioning of the audio and/or video source segment 28 into multiple data blocks and the characteristics of each block. Although, the source segment 28 is shown as being located within the data storage library 14, one of ordinary skill in the art will recognize that the source segment 28 can alternatively be physically located outside of the library, e.g., on a CD-ROM or DVD, and referenced, e.g., by pointers, by the characteristic table 30. FIG. 2 shows an exemplary structure for the characteristic table 30. Each entry 26 in the characteristic table 30 contains a definition/pointer 32 which includes identifying information for the library entry, e.g., a title and the physical location of the audio and/or video source segment 28, e.g., a CD-ROM file. Each characteristic table entry 30 is further divided into a plurality of entries that define blocks, i.e., audio and/or video data blocks, and associated characteristics for the audio and/or video from the audio and/or video source segment 28.

In a simplified example, an audio and/or video source segment 28 is divided into five blocks: A, B, C, D, E, F where the sequence ABCDEF corresponds to the audio and/or video source segment 28. Although, other combinations of blocks, e.g., FEDCBA, can also create audio and/or video sequences, not all block sequences will create aesthetically reasonable audio and/or video sequences. Thus, information is preferably derived to determine interblock compatibility, i.e., the ability of a block to sequentially follow (or alternatively sequentially precede) each other block according to aesthetic, e.g., musical, criteria. For example, while block C may reasonably follow block B, it may not be aesthetically reasonable for it to follow block A. Additionally, while some blocks, e.g., A, are suitable according to aesthetic criteria to reasonably start an audio and/or video sequence, other blocks are not. Similarly, only certain blocks, e.g., F, are suitable according to aesthetic criteria to reasonably end an audio and/or video sequence. Lastly, not all audio and/or video source segments 28 can reasonably be divided into fixed length blocks. In fact, using reasonable aesthetic criteria, blocks will generally be differently sized. Consequently, audio and/or video sequences of many different durations can be achieved by combining different combinations of these differently-sized blocks. However, as previously described, the available combinations are limited by the compatibility between potentially adjacent blocks as well as their suitability to begin or end an audio and/or video sequence. Corresponding to these criteria, data in the characteristic table 30 contains parameters for each audio and/or video block pertaining to a (1) duration 34, (2) type attribute (e.g., beginning/ending) 36, and (3) an interblock compatibility list 38 (e.g., a list of which blocks can aesthetically follow and/or precede the current block). Additionally, information (not shown) identifying the physical location of each audio and/or video block in the audio and/or video source segment 28 is preferably retained in the characteristic table 30. While data in the characteristic table 30 can be manually generated, automated procedures are also possible.

Figure 3A:
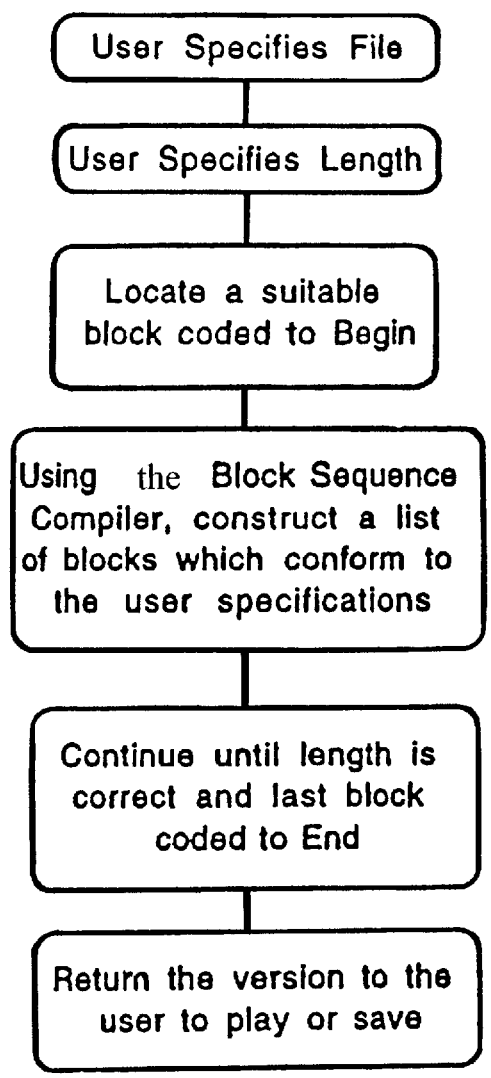
FIG. 3A is a simplified flow chart of the operation of the system of FIG. 1.
Figure 3B:
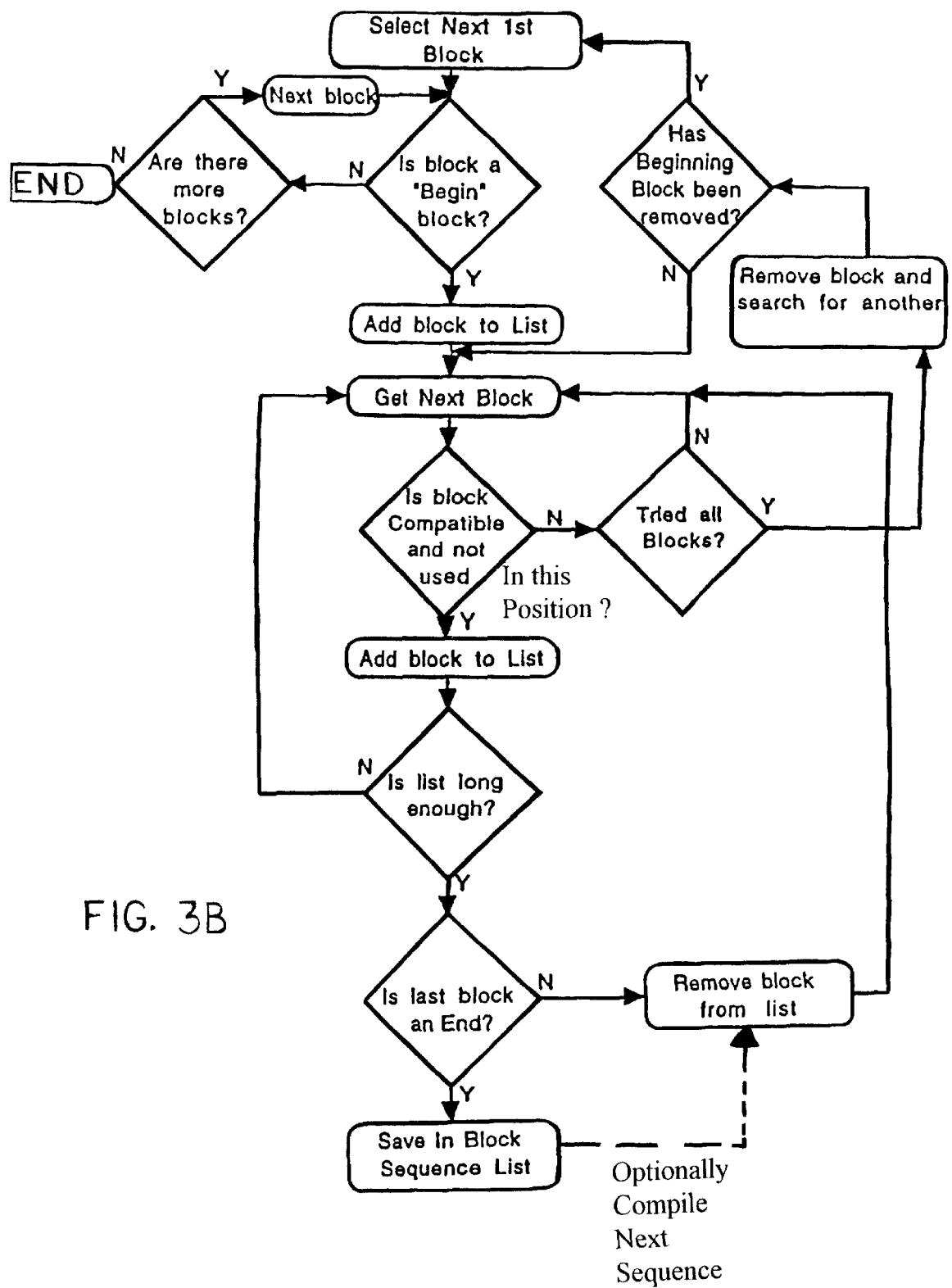
FIG. 3B is a simplified flow chart depicting the process implemented by the block sequence compiler.

FIG. 3B shows a simplified flow chart exemplary of the iterative process implemented by the block sequence compiler 16 after being provided the user-prescribed data (as shown in FIG. 3A). As previously described, after the user has determined a selection 40 from the data storage library 14 and a duration 42, the block sequence compiler 16 operates on the data in the characteristic table 30 according to the flow chart of FIG. 3B. Accordingly, a list of potential output sequences is compiled that conform to the characteristic table 30 and these sequences are stored in the potential block sequence list 19. In order to conform to the characteristic table, each block in an output sequence must be compatible with each adjacent block according to its interblock compatibility characteristic 38, i.e., each block must be compatible with blocks which directly precede and follow in an output sequence. Additionally, it is preferable that each sequence begin with a block having a beginning characteristic 38 set and end with a block having an ending characteristic 36 set.

FIG. 4 shows an exemplary characteristic table for a fifty second audio and/or video source segment 28. In this example, the source segment is partitioned into ten blocks, each being five seconds long. (While fixed length blocks exist in this example, this is generally not the case). In this example, blocks A and C have been marked as potential beginnings and blocks E and J have been marked as potential endings. In the example shown in FIG. 5, the user has selected a duration 42 of thirty-five seconds for this source segment 28. Accordingly, FIG. 5 shows the iterations performed by the block sequence compiler 16 on the characteristic table 30 of FIG. 4 according to the flow chart of FIG. 3B. FIG. 5 shows that the original audio and/or video sequence has now been rearranged into three potential sequences (ABCDEFGJ, ABCDEFHE, CDEFGHIJ) that each (1) have the prescribed duration, (2) begin with a beginning block, and (3) end with an ending block.

In an exemplary audio environment, the generator 10 allows users to quickly and easily create movie or record quality music soundtracks for any application or document that can import sound. The sequence generator 10 is able to accomplish this by processing an audio source segment, e.g., music, in response to user inputs. The user selects a musical style and sub-style from a list, then specifies the length (preferably in minutes, seconds and tenths of seconds). A musical source segment is selected from the library that meets the user's needs and a custom version of that music is created that is exactly (within user-prescribed criteria) the specified length. If the user doesn't like the selected music, the user can hear a different version of the same music or a different piece music—all of the versions presented will fit the user's specifications.

By using music and its corresponding characteristic table 30 and input from the user, the block sequence compiler 16 can customize the following aspects of the music:

The length of the music can be customized in tenths of a second increments from seconds to hours.

Different versions of the same piece of music (sometimes hundreds of thousands of options) can be generated.

In an alternative embodiment, the block sequence compiler 16 can customize the intensity of the music. The user can define a desired intensity curve 44. This will allow the user to have the program make a piece of music that begins softly (perhaps while an announcer speaks) and builds to a climax (perhaps when the narration has ended). In this embodiment, an intensity parameter 46 is added to the characteristic table 30 for each block and the block sequence compiler 16 selects blocks that most closely correspond to the prescribed intensity curve 44.

In a next alternative embodiment, the user can specify a mood selection 48 to modify the mood of the music without changing any other characteristics. In this embodiment, a mood parameter 50 is added to characteristic table 30. Additionally, multiple renditions of the audio source segment 28 are prerecorded corresponding to different moods. The block sequence compiler 16 will then select renditions that correspond to the prescribed mood parameter 50.

In another alternative embodiment, a user can specify a first duration of background music followed by a second duration of introductory music. The compiler 16 will be able to locate two different pieces of music and make a smooth, musical, transition between them.

In an additional alternative embodiment, blocks can be identified with a fadeable parameter 52 in the characteristic table 30. When a block is fadeable, its duration can be truncated to become a satisfactory end block, even if its duration would normally be too long. The compiler 16 can then truncate the fadeable block to achieve the user-prescribed duration. Additionally, the intensity of the end of the fadeable block will fade at a prescribed rate to reduce the effects of the truncation.

In still another embodiment, each block can be identified in the characteristic table 30 as having a hit point parameter 54 that defines the location (when present) of an intensity burst. When prescribed by the user, the block sequence compiler 16 can use the hit point parameter 54 to place an intensity burst at a user-prescribed location (e.g., defined by intensity curve 44) in the generated audio output sequence.

Similar aspects of a corresponding video (e.g., video clip or animation) sequence can also be customized by the compiler 16 according to data within the characteristic table 30. For example, if a static parameter 55 is placed within the characteristic table 30, this parameter can be used to identify blocks, preferably additionally having an ending type 36, that can be extended to a desired duration and thus can be used to simplify matching the user-prescribed duration 42. Accordingly, especially in a video environment, the last block can end with a still picture (a "freeze frame") that can be maintained as long as required to produce a sequence having the prescribed duration 42.

The following defines the data structure for each block of the characteristic table in this exemplary audio embodiment:

| | |
|---|---|
| fileInfo | a pointer to which audio source segment this block is associated with |
| blockStart | the sample number within the audio source segment at which this block begins |
| blockLength | the number of samples that this block contains. The end sample number is derived by adding blockStart and blockLength |
| blockName | the name to display on this block (no longer than 15 characters |
| blockDesc | the long text description of this block (up to 63 characters) |
| compatibility | an array of bits specifying this block's compatibility with all other blocks in this file (described below) |
| usageFlags | bit flags indicating properties of this block (described below) |
| nextBlock | the block number of the best block to following this block |
| quickEnd | the block number of the best next block to end the music quickly |
| blockSection | a section number of this block assigned for use in grouping sub-blocks into grouped blocks for display |
| blockPriority | a priority number of this block assigned for use in displaying blocks at different detail levels |
| blockType | a set of bits specifying if this block should be displayed, if the block is in-use, and other status flags. USER_BLOCK_TYPE, INVISIBLE_BLOCK_TYPE, AVAILABLE_BLOCK_TYPE |
| selected | a True/False flag indicating if the block is currently selected |
| intensity | each block is assigned an intensity index in relation to the other blocks in the file. The higher the intensity number, the more intense the audio in the block is in relation to the other blocks. |
| hitPoint | the sample number, if any, of a musical "Hit" within the block. (0 for no significant hit) |

| | -continued |
|---|---|
| moodIndex | a number grouping this blocks mood with other blocks mood. All blocks with the same moodIndex will have the same mood. |
| next | a pointer to the next block |

Compatibility

Each block has an array of unsigned longs which are used as an array of bits. Each bit corresponds to a block from the data storage library 14, e.g., bit 15 should be set if the block is compatible with block 15. Compatible blocks are blocks which sound musically correct when they are played one after the other. For example, Block A should be flagged as compatible with Block B when it sounds musically correct to listen to Block A followed by Block B. If Block B was the 24th block from the library source segment, then bit 24 of Block A's compatibility array should be set.

| USAGEFLAGS | |
|---|---|
| DEAD_END_FLAG | Set if this block will lead you directly toward an ending. Set this bit if this block is a bad choice to build a long cue (1L<<0) |
| NEXT_CONTIGUOUS_FLAG | Set this bit if the next block doesn't need a crossfade to make a good sounding transition (1L<<1) |
| FADEABLE_BLOCK | Set this bit to signal that this block can be effectively faded (in volume) to any length. (1L<<2) |
| BEGINING_BLOCK | Set this bit if the block is a good choice (sounds musically correct) to begin a selection (1L<<30) // 0x40000000 |
| ENDING_BLOCK | Set this bit if the block is a good choice to end a selection (1L<<31) // 0x80000000 |

While some of the above functions (further defined in the data structure below) can be applied to existing music (through a process of specifying block characteristics), some are dependent on a custom music library in which music is composed and performed in a specific format.

```
struct BlockStruct {
    SoundFileInfoPtr  fileInfo; //     pointer to file
                                       struct for this block
    unsigned long     blockStart;//    sample number
    unsigned long     blockLength;//   number of samples
    Str15             blockName;
    Str63             blockDesc;
    unsigned long     compatibility[COMPAT_SIZE];
    unsigned long     usageFlags;
    short             nextBlock;
    short             quickEnd;
    unsigned char     blockSection;
    unsigned char     blockPriority;
    BlockTypes        blockType;
    Boolean           selected;
    BlockStructPtr    next;
};
```

HINTING/WARNING

Using the characteristic table data associated with each data block, the user is assisted by visually displaying information about the blocks. Block attributes including beginnings, endings and compatibility are all displayed.

| Beginning- | displayed by a stair-step pattern on the left edge of the block |
|---|---|
| Ending- | displayed by a stair-step pattern on the right edge of the block |
| Compatibility- | the rightmost end cap of a selection in the sequence window is colored and all of the compatible blocks in the block window will have their left end caps colored. |
| Warning- | when two non-compatible blocks are next to each other, we display a red edge at their junction. |

The process of specifying characteristics of music and sound is both musical and technical. This process is used to provide as much information as possible about each piece of music or sound so that the compiler 16 can make informed, musical decisions, when it manipulates the music according to requests from users. This process includes the following:

1. Block Start and End: The beginning and ending of each discrete music section (block) is determined. This necessarily determines the length of each block. Listen to the piece of music and divide it into segments based on musical phrases and musical uses called blocks. On average, there are fifteen blocks per minute of music.
2. Block Name: Code each block with a name and description.
3. Beginning Blocks: For each block a determination is made as to whether it would make a good way to start a musical section or phrase.
4. Ending Blocks: Same concept as that described for Beginning Blocks.
5. Block Compatibility: Each block is tested for its specific compatibility to each and every other block which comprise the source audio segment.
6. Intensity: Code each block's musical intensity relative to other blocks.
7. Fadeable Block: Each block has a determination made as to whether it sounds musically viable to fade or not.

In a further aspect of the present invention, a user may alternatively prescribe a repeatable audio and/or video sequence (or subsequence), e.g., a looping sequence, that is capable of repeating and thus has an extended duration. In this embodiment, a last block 56 of a compiled sequence 58 is chosen that is compatible (according to compatibility data 38) with a first block 60 of the compiled sequence 58. While the beginning/ending attribute 36 is of limited significance with such a repeatable sequence (and accordingly an ending attribute is preferably not required), it is still aesthetically preferable that the sequence initially begin with a block having a beginning attribute. Additionally, while a principal duration 62 of the compiled block sequence (the time duration from the beginning of the first block of the repeatable sequence to the end of the last block of the repeatable sequence) does not alter the duration of the looping sequence (i.e., repeating a twenty second portion thirty-five times or repeating a thirty-five second portion twenty times both result in the same extended durations), the aesthetic effect of such sequences are generally effected by the principal duration 62. Accordingly, it is preferable that the block sequence compiler 16 accept directions via user interface 17 to determine the sequence of blocks according to duration 42.

Figure 6:
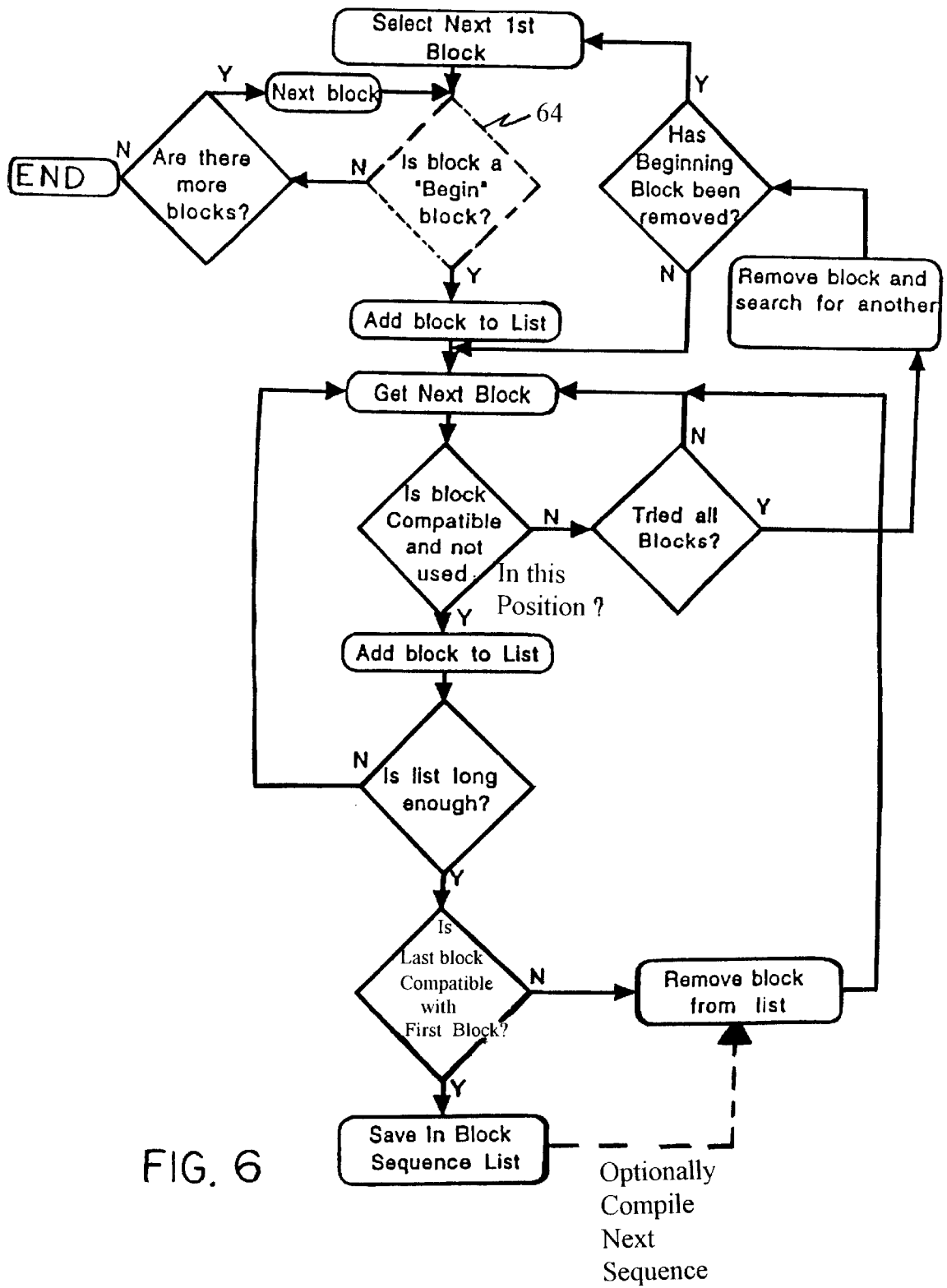
FIG. 6 is a simplified flow chart depicting the process implemented by the block sequence compiler to compile a repeatable audio and/or video sequence generated by looping the last block to the first block of the compiled sequence.

Accordingly, using the exemplary flow chart of FIG. 6, a user specifies duration 42 to specify the principal duration 62. FIG. 7 shows the processing of the data of FIG. 8 according to the flow chart of FIG. 6 for a principal duration of thirty-five seconds (compiling sequences ABCDEFGJ and ABCDEFHE). Accordingly, it is noted that while the end block of the principal loop may have an ending attribute 36 (e.g., block E), this is not a requirement of the algorithm of FIG. 6. Additionally, FIG. 7 shows the alternative processing when the algorithm of FIG. 6 is altered to eliminate the restriction (specified in program step 64) that requires that the compiled sequence begin with a block having a beginning attribute 36. Consequently, a sequence of CDEF-GHIJ is compiled.

Figure 9:
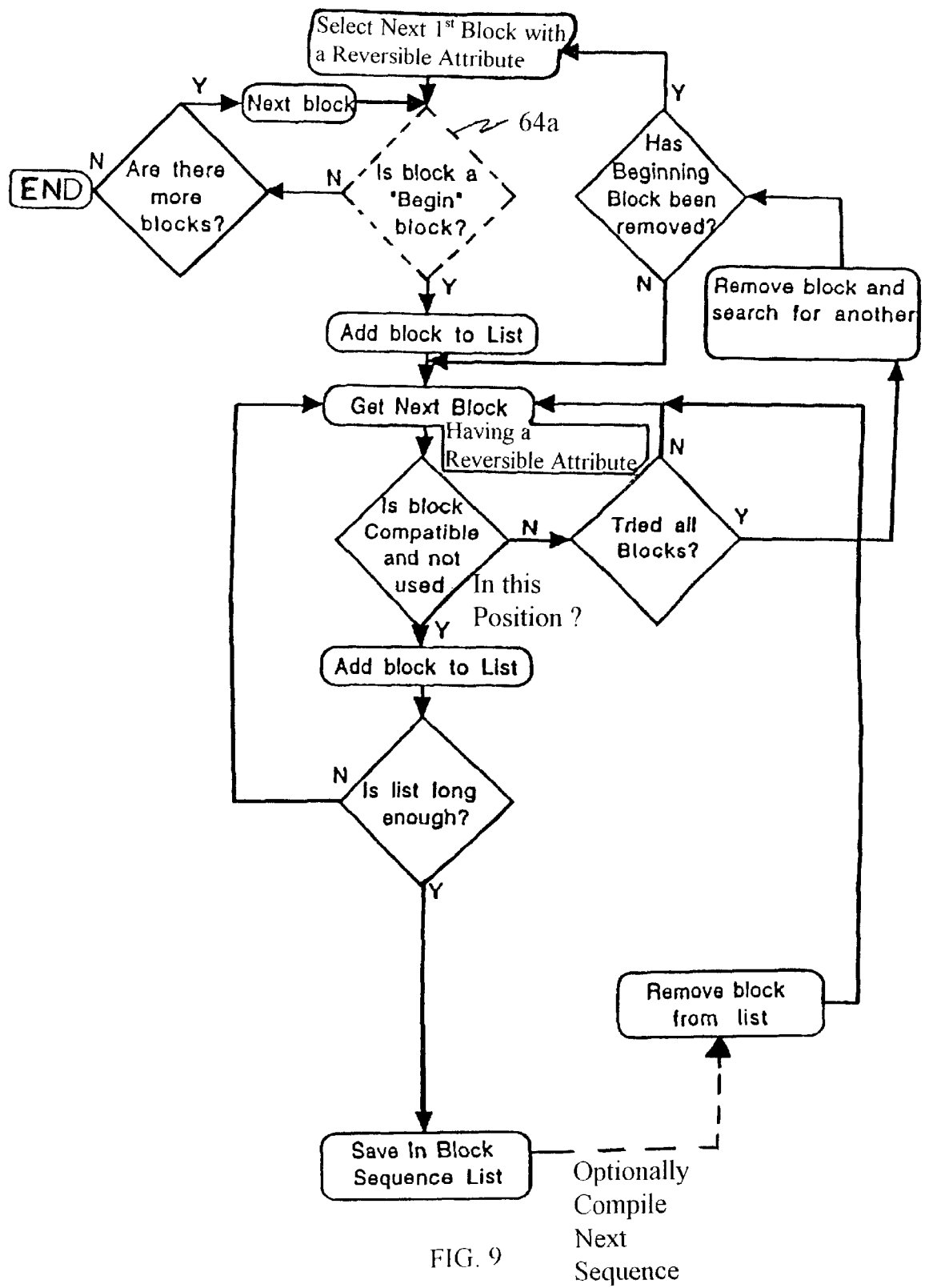
FIG. 9 is a simplified flow chart depicting the process implemented by the block sequence compiler by selecting blocks having a reversible attribute to compile a repeatable audio and/or video sequence.

In a next variation, e.g., in a visual environment, portions of the source audio and/or video segment 28 are determined which can play equally well in a forward or in a reverse direction. Accordingly, an infinite loop can be defined by selecting a sequence of compatible blocks accordingly to compatibility list 38 that additionally have a reversible attribute 66 set. Accordingly, if block sequence compiler 16 operates on the data of FIG. 10 according to the algorithm of FIG. 9 and a prescribed duration 42 of twenty seconds, a sequence of CDEF, CDCD, or CDED will result. When played, these sequences will preferably reverse in direction at the end of the last block and at the beginning of the first block (when being played backwards).

While the above description has primarily discussed uses where the entire sequence is repeatable, alternative uses are also considered within the scope of the present invention. For example, the repeatable sequence could be only a portion, i.e., a subsequence, of the compiled output sequence. In an exemplary case, a first portion of the output sequence is compiled according to first user-specified duration (J), a second portion of the output sequence is compiled according to a second user prescribed principal duration (K) that is repeatable a user-specified number of times (L), and a third portion of the output sequence is compiled according to a third user-specified duration (M). Consequently, the resulting duration will be J+(K*L)+M.

As described, embodiments of the invention are suitable for generating audio and/or video output sequence suitable for presentation on a single output channel, e.g., as a single audio track, a single MIDI output, a single video clip output, a single animation, etc. In an exemplary use, it may be required to compile a thirty second video sequence as a video output to combine with an existing audio track, e.g., assorted pictures of a new car with a predefined description of its features, or to add a musical interlude to a predefined video clip, and thus create a car commercial. However, it may also be desirable to compile both a video sequence and an audio sequence to satisfy the user-defined duration criteria 42, e.g., thirty seconds. However, it will generally be significant that the audio and video channels correlate, e.g., an audio track describing braking characteristics should not be combined with video clips of crash tests. Therefore, FIG. 11 shows a simplified block diagram of an embodiment that enables compiling (using multiple block sequence compilers 16a–16n or preferably by time sharing a single block sequence compiler 16) multiple channels of audio and video 68a–68n, i.e., multimedia, and cross-correlating the potential block sequence lists 19 using cross-correlator 70 to ensure compatibility between the multiple channels. To achieve this task, the cross-correlator 70 operates upon additional compatibility data 38, e.g., data which shows the interblock compatibility between the blocks in each channel 68, i.e., interchannel compatibility. For the example of FIG. 12, the characteristic table 30 contains additional compatibility data 38 to ensure that BLOCK $1_n$ is compatible with both BLOCK $1_1$ and BLOCK $2_1$ (since the blocks sizes are not the same on CHANNEL$_1$ and CHANNEL$_n$, BLOCK $1_n$ overlaps both BLOCK $1_1$ and a portion of BLOCK $2_1$).

Although the present invention has been described in detail with reference only to the presently-preferred embodiments, those of ordinary skill in the art will appreciate that various modifications can be made without departing from the invention. Accordingly, the invention is defined by the following claims.

We claim:

1. A system for compiling data blocks for producing a prescribed duration output sequence suitable for driving an output transducer, said system comprising:

a data storage library storing one or more source segments wherein each source segment is capable of being partitioned into a plurality of data blocks;

a stored data table comprised of one or more groups of table entries, each such group being associated with a different one of said source segments and wherein each table entry defines a data block within the associated source segment;

each said table entry additionally identifying characteristics of the associated data block including its duration, its suitability to begin or end an output sequence, and its interblock compatibility;

a user interface for enabling a user to prescribe an output sequence duration; and a block sequence compiler for iteratively compiling a list of one or more output sequences each essentially conforming to said prescribed output sequence duration and wherein each output sequence is comprised of a plurality of data blocks selected according to said table entry characteristics.

2. The system of claim 1 additionally comprising means for displaying said list of one or more output sequences.

3. The system of claim 1 additionally comprising means to store at least one said output sequence from said list.

4. The system of claim 1 additionally comprising means for driving an output transducer according to an output sequence selected from said list.

5. The system of claim 1 wherein said table entries additionally include data identifying a mood parameter for each said data block and said user interface additionally enables a user to prescribe a mood parameter and said block sequence compiler selects data blocks according to said user-prescribed mood parameter.

6. The system of claim 1 wherein said table entries additionally include data identifying a fadeable parameter for each said data block and said block sequence compiler selects an ending data block having said fadeable parameter set and wherein such fadeable data blocks can be truncated to achieve output sequences of said user-prescribed output sequence duration.

7. The system of claim 1 wherein said table entries additionally include data identifying an intensity parameter for each said data block and said user interface additionally enables a user to prescribe an intensity curve and said block sequence compiler selects data blocks according to said user-prescribed intensity curve.

8. The system of claim 1 wherein said table additionally comprises data identifying a hit point parameter for each said data block for specifying when an intensity burst is present within said data block and said user interface additionally prescribes an intensity burst location and said block sequence compiler compiles output sequences of said data blocks according to said user-prescribed intensity burst location.

9. The system of claim 1 wherein said user interface additionally enables a user to prescribe one of said source segments and said block sequence compiler compiles output sequences of data blocks selected from said user-prescribed source segment.

10. The system of claim 1 wherein said table entries additionally include data identifying a static parameter for each said data block and said block sequence compiler can select an ending data block having said static parameter set and wherein such static data blocks can be extended to form output sequences of said user-prescribed output sequence duration.

11. A method for compiling data blocks for producing a prescribed duration output sequence suitable for driving an output transducer, said method comprising the steps of:

provide data in a data storage library corresponding to at least one source segment;

partitioning said source segment into a plurality of data blocks;

indicating characteristics corresponding to the duration of each data block;

indicating characteristics of each data block corresponding to the suitability of each data block to begin or end an output sequence and the interblock compatibility of each data block;

defining a desired duration for an output sequence; and iteratively compiling a list of one or more output sequences essentially conforming to said prescribed output sequence duration and wherein each output sequence is comprised of a plurality of data blocks selected according to said table entry characteristics.

12. The method of claim 11 additionally comprising the step of selecting one of said source segments and wherein said iteratively compiling step compiles sequences of data blocks from those data blocks corresponding to a selected source segment.

13. The method of claim 11 additionally comprising the step of displaying said compiled list of one or more output sequences.

14. The method of claim 11 additionally comprising the steps of:

selecting one of said output sequences from said compiled list; and outputting a sequence of data blocks corresponding to said selected output sequence.

15. A method for compiling data blocks for producing a prescribed duration output sequence suitable for driving an output transducer wherein said output sequence is comprised of a plurality of data blocks corresponding to portions of a source segment and indicating characteristics of each data block corresponding to its duration, its suitability of each data block to begin or end an output sequence, and its interblock compatibility, said method comprising the steps of:

defining a desired output sequence duration; and iteratively compiling a list of one or more output sequences each comprised of a plurality of data blocks according to said desired output sequence duration such that each said output sequence is comprised of a plurality of data blocks conforming to its indicated characteristics.

16. A system for compiling data blocks for producing an output sequence suitable for repeatable driving an output transducer, said system comprising:

a data storage library for storing one or more source segments wherein each source segment is capable of being partitioned into a Plurality of data blocks;

a stored data table comprised of one or more groups of table entries, each such group being associated with a different one of said source segments and wherein each table entry defines a data block within the associated source segment;

each said table entry additionally identifying characteristics of the associated data block including its duration and its interblock compatibility;

a user interface for enabling a user to prescribe an output sequence duration corresponding to the durations of said data blocks comprising an output sequence; and a block sequence compiler for iteratively compiling a list of one or more repeatable output sequences each comprised of a plurality of data blocks selected to essentially conform to said user-prescribed output sequence duration and wherein each output sequence is comprised of a Plurality of data blocks selected according to said table entry characteristics.

17. The system of claim 16 additionally comprising means for displaying said list of one or more output sequences.

18. The system of claim 16 wherein each said repeatable sequence comprises at least a first data block and a last data block and wherein said last data block of each said repeatable output sequence is selected such that the first data block of each said repeatable output sequence is compatible, according to said table entries, to sequentially follow said last data block of each said repeatable output sequence.

19. The system of claim 16 wherein said table entries additionally include a reversible parameter to identify data blocks suitable for playing both in a forward or in a reverse direction and each said data block selected by said block sequence compiler has said reversible parameter set.

20. The system of claim 16 additionally comprising means for driving an output transducer according to an output sequence selected from said list.

* * * * *

/

(12) EX PARTE REEXAMINATION CERTIFICATE (9146th)
United States Patent
Hufford et al.

(10) Number: US 5,877,445 C1
(45) Certificate Issued: Jul. 24, 2012

(54) SYSTEM FOR GENERATING PRESCRIBED DURATION AUDIO AND/OR VIDEO SEQUENCES

(75) Inventors: Geoffrey Calvin Hufford, Granada Hills, CA (US); Christopher P. Hufford, Chatsworth, CA (US); Kevin C. Klingler, Chatsworth, CA (US)

(73) Assignee: Smartsound Software, Inc., Northridge, CA (US)

Reexamination Request:
No. 90/012,218, Mar. 30, 2012

Reexamination Certificate for:
Patent No.: 5,877,445
Issued: Mar. 2, 1999
Appl. No.: 08/957,422
Filed: Oct. 24, 1997

Related U.S. Application Data

(63) Continuation-in-part of application No. 08/532,527, filed on Sep. 22, 1995, now Pat. No. 5,693,902.

(51) Int. Cl.
   *G10H 1/00* (2006.01)

(52) U.S. Cl. .................... 84/602; 707/E17.009; 84/609; 84/610; 84/649; 84/650

(58) Field of Classification Search .................... None
See application file for complete search history.

(56) References Cited

To view the complete listing of prior art documents cited during the proceeding for Reexamination Control Number 90/012,218, please refer to the USPTO's public Patent Application Information Retrieval (PAIR) system under the Display References tab.

*Primary Examiner* — Fred Ferris

(57) ABSTRACT

A block sequence compiler for compiling a sequence of audio and/or video blocks (e.g., audio tracks, MIDI, video clips, animation, etc.) suitable for producing one or more audio and/or video output sequences (i.e., audio, video, or multimedia) each having a duration corresponding to user-prescribed criteria. In a preferred embodiment, a user chooses an audio and/or video source segment from a pre-defined library and prescribes the duration of an audio and/or video sequence. Prior to depositing each audio and/or video segment in the library, the segment is partitioned into audio and/or video blocks that are identified in a corresponding characteristic data table with characteristics including (1) duration, (2) suitability for being used as a beginning or ending of an audio and/or video sequence, and (3) compatibility with each block. Using this characteristic table and the user-prescribed criteria, i.e., duration, the block sequence compiler generates a plurality of audio and/or video sequences satisfying the user-prescribed criteria which can be reviewed, e.g., played, and/or saved for future use.

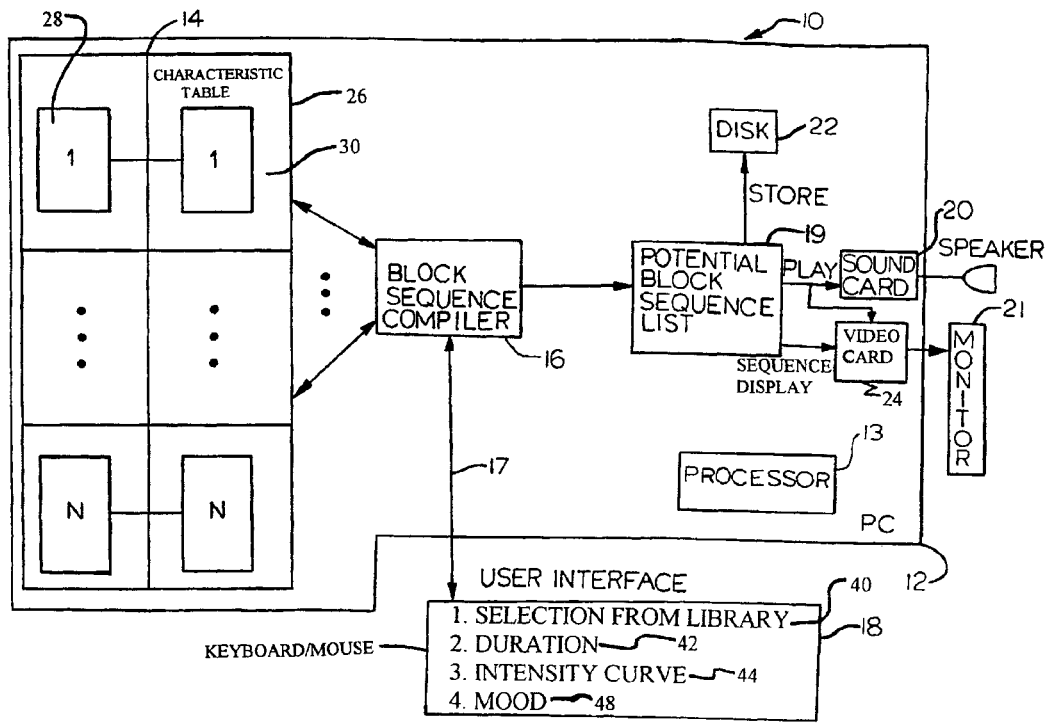

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-20 is confirmed.

* * * * *